United States Patent
Oksman

(10) Patent No.: US 7,738,543 B2
(45) Date of Patent: Jun. 15, 2010

(54) METHODS AND SYSTEMS FOR DETERMINING COMMUNICATION PARAMETERS

(75) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 884 days.

(21) Appl. No.: 11/509,464

(22) Filed: Aug. 24, 2006

(65) Prior Publication Data

US 2007/0280339 A1     Dec. 6, 2007

Related U.S. Application Data

(60) Provisional application No. 60/810,907, filed on Jun. 5, 2006.

(51) Int. Cl.
*H04B 1/38* (2006.01)
(52) U.S. Cl. ..................................................... 375/222
(58) Field of Classification Search ......... 375/220–223, 375/225–227, 316
See application file for complete search history.

(56) References Cited

U.S. PATENT DOCUMENTS

| | | | |
|---|---|---|---|
| 6,977,977 B1 | 12/2005 | Dubrovin et al. | |
| 2006/0056305 A1 | 3/2006 | Oksman et al. | |
| 2006/0198430 A1* | 9/2006 | Rhee et al. | 375/222 |
| 2008/0232444 A1* | 9/2008 | Tzannes | 375/219 |
| 2009/0086800 A1* | 4/2009 | Cioffi | 375/222 |

\* cited by examiner

*Primary Examiner*—Don N Vo
(74) *Attorney, Agent, or Firm*—Eschweiler & Associates, LLC

(57) ABSTRACT

One embodiment of the present invention relates to a method of determining an impulse noise protection parameter in a communication system. In the method, it is determined if a first set of received data elements are corrupted so as to exceed an initial corruption threshold. It is then determined if a second set of received data elements are corrupted so as to exceed an adjusted corruption threshold. Communication parameters are set as a function of whether the initial corruption threshold or adjusted corruption threshold is exceeded. Other methods and systems are also disclosed.

34 Claims, 7 Drawing Sheets

METHODS AND SYSTEMS FOR DETERMINING COMMUNICATION PARAMETERS

REFERENCE TO RELATED APPLICATIONS

This application claims the benefit of U.S. Provisional Application No. 60/810,907 filed Jun. 5, 2006 the contents of which are herein incorporated by reference in their entirety.

FIELD OF THE INVENTION

The present invention relates generally to communication methods, and more specifically to determining a communication parameter in a communication system.

BACKGROUND OF THE INVENTION

In today's business climate, industry fortunes rise and fall on whether information is exchanged in an efficient manner. Cell phones, pagers, and the Internet have thrived because each allows businesses to exchange critical market information at a moment's notice. In addition, such technologies allow individuals to keep abreast of recent developments with family and friends. In short, many segments of our modern society require instant access to accurate, up-to-the-minute information.

Digital subscriber line (DSL) technology is one technology that provides users with high-speed data. As networking technology has matured, data rates have increased from 20 kilobits per second in 1975, to 100 megabits per second with modern VDSL. In other words, DSL customers in today's "information age" can receive data approximately 5,000 times as fast as network customers of thirty years ago. To bring customers into this modern "information age", DSL developers have spent billions of dollars to develop the technology as we now know it. To continue to increase data rates at such a remarkable pace, DSL developers will likely be required to spend significant capital resources for many years to come. Thus, DSL technology showcases the premium that our society places on fast and accurate information.

A DSL communication system includes two modems which communicate over an ordinary telephone line (i.e., a twisted pair of copper wires in a conventional residential telephone system). One popular type of DSL technology uses discrete multi-tone, or DMT, to transmit data over a network. In DMT, the communicating modems divide data over a number of sub-carriers that span the frequency range assigned to DSL. For example, in one DSL implementation, 247 separate sub-carriers, each 4 KHz wide will span the DSL frequency range. Thus, as shown in FIG. 1a and FIG. 1b, one could think of DSL technology as the phone company or service provider dividing the frequency spectrum in a phone line 100 into numerous individual 4-KHz bands (or sub-carriers 102), and then transmitting data over each sub-carrier 102. Thus, by using a modem, a customer in the prior mentioned DSL implementation could receive data over 247 sub-carriers over one phone line, and thereby receive high-speed data.

In various types of DSL, the communicating modems monitor each sub-carrier, and if the noise on one sub-carrier becomes too high, then the communicating modems switch to transfer data on another sub-carrier. Thus, typical DSL systems continually switch data from one sub-carrier to another to provide users a high data rate that has relatively few data errors. Although monitoring the sub-carriers and encoding and decoding messages on each sub-carrier makes DMT computationally complex, it gives DMT the ability to provide users with high speed data connections with relatively few errors.

One specific area in which DSL and other communication systems are progressing is by limiting the number of errors as data is transmitted over the line. Impulse noise is one type of noise in communication systems that can occasionally erase an entire modulated signal for a period of time that is equal to one or more transmitted symbols. In DSL communication systems, this erasure can occur regardless of the number of bits allocated to the entire channel or to particular sub-carriers. Further, the specific time of the erasure is usually unpredictable, except the case of the periodic impulse noise, and frequency of erasures can change depending on the time of the day. Therefore, impulse noise parameters and the frequency of erasures are usually unknown at the time of system installation.

If a communication system uses proper noise protection parameters, it can likely correct data errors. However, prior art solutions do not provide for adequate methods or systems to accurately determine impulse noise protection parameters. Although various protocols have been proposed, none of these proposed protocols specify a monitoring process that provides for an unambiguous value of impulse noise monitoring.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a method of determining an impulse noise protection parameter in a communication system. In the method, it is determined if a first set of received data elements are corrupted so as to exceed an initial corruption threshold. It is then determined if a second set of received data elements are corrupted so as to reach or exceed an adjusted corruption threshold. Communication parameters are set as a function of whether the initial corruption threshold or adjusted corruption threshold is reached or exceeded.

The following description and annexed drawings set forth in detail certain illustrative aspects and implementations of the invention. These are indicative of but a few of the various ways in which the principles of the invention may be employed.

DETAILED DESCRIPTION OF THE INVENTION

Figure 1A:
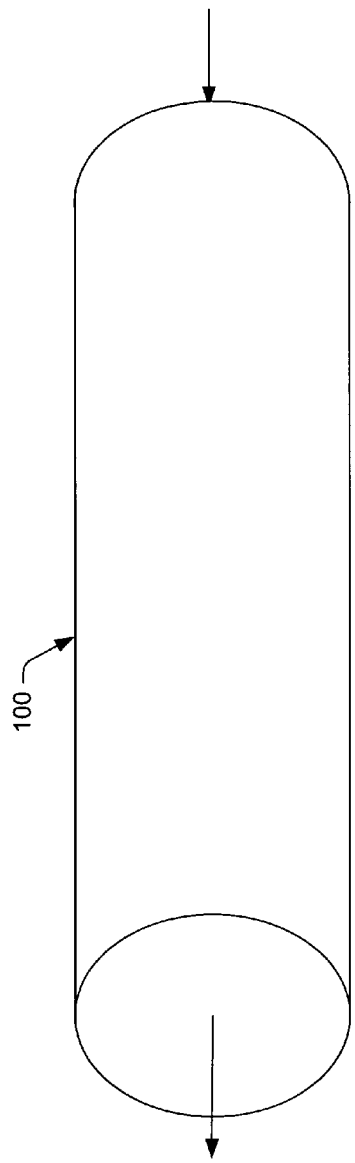
FIGS. 1a and 1b illustrate one embodiment of DSL technology.
Figure 1B:
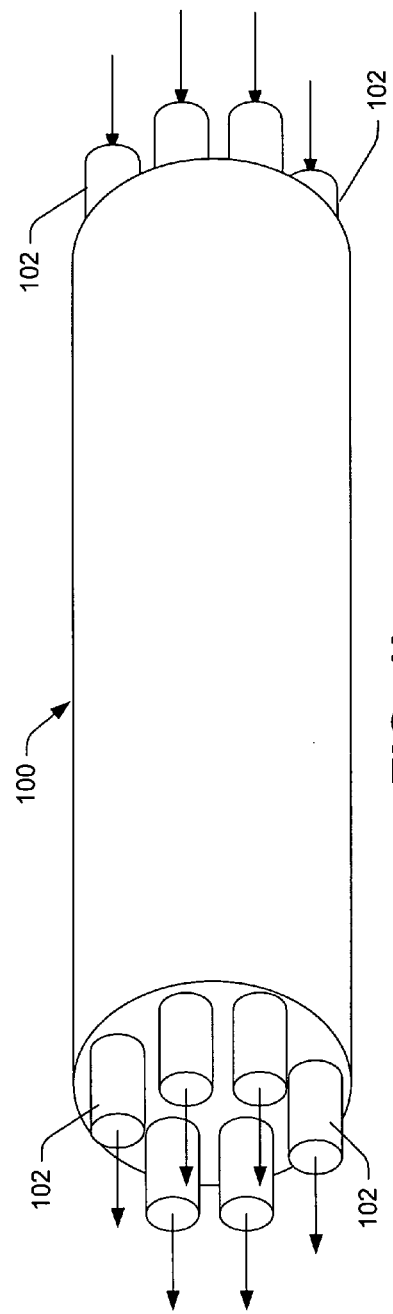

The present invention will now be described with reference to the drawings wherein like reference numerals are used to refer to like elements throughout, and wherein the illustrated structures are not necessarily drawn to scale. Although various illustrated embodiments refer to a DSL communication system, the invention finds utility in association with any type of communication system, including but not limited to DSL systems, cable modem systems, wireless systems, and single or multi-carrier communication systems. Further, the invention finds utility in communication systems that exchange data elements while employing one or more communication parameters to regulate communication between communication endpoints (e.g., modems), and wherein any type of impulse noise protection techniques may be employed and adjusted according to impulse noise conditions.

Figure 2:
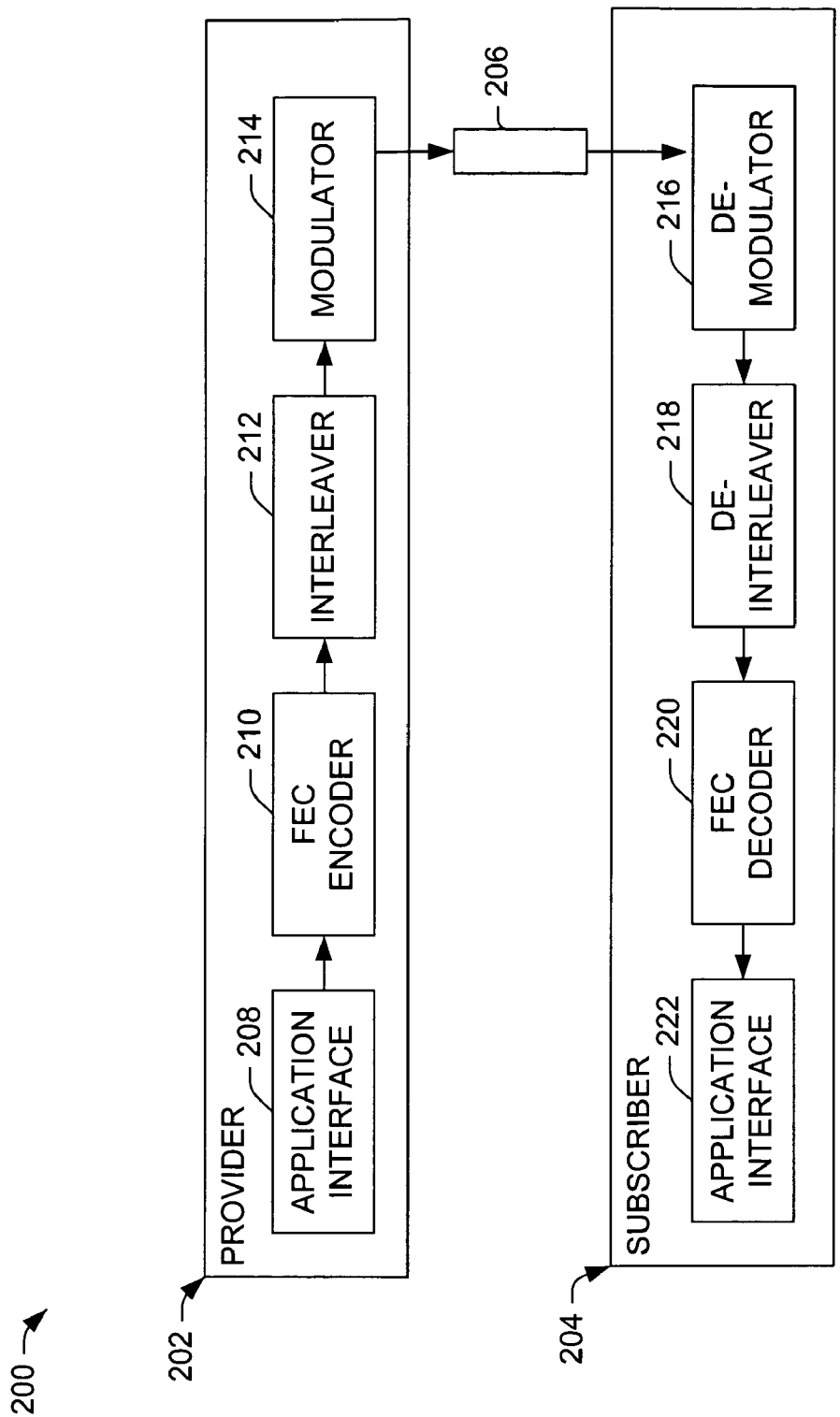
FIG. 2 is a block diagram illustrating one embodiment of a DSL communication system.

FIG. 2 illustrates a multi-carrier DSL communication system 200 in which one or more aspects of the invention may be implemented, comprising first and second DSL modems 202 and 204, respectively, coupled to a transmission line 206. One transmission line is a twisted pair of copper wires in a residential telephone system, although the invention may be employed in communications systems using any type of line by which data can be transferred between the modems. Exemplary modems are DSL modems having suitable circuitry for providing DSL communication service on the line generally in accordance with ANSI T1.413 (ADSL), T1.424 (VDSL), G.993.2 (VDSL2) and other DSL standards, including the performance of the tasks and functions described herein.

In order to appreciate the various aspects of the invention, the illustrated system 200 and the various methods of the invention are hereinafter described with respect to data being transferred from the provider modem 202 over the line 206 to the subscriber modem 204. Accordingly, in the following discussion, the first modem 202 may be referred to as a "transmitter" or an "initiator" and the second modem 204 may be referred to as a "receiver" or a "responder" for purposes of describing the various aspects of the invention. However, it will be appreciated that both modems 202 and 204 are capable of transmitting and receiving data in the illustrated implementation, and similarly that both modems 202 and 204 are capable of being an initiator and a responder.

Referring now to FIG. 2 and FIGS. 3a-3f, one embodiment of a DSL communication system 200 and its associated data processing are now discussed. As shown in FIG. 2, the transmitter of the first modem 202 includes an application interface 208 for interfacing to a host system. The application interface 208, at the transmitter, is a construct for entering data into the system, while the application interface 222, at the receiver, is for outputting received data from the system. Typically, application data is provided at the application interface 208 as a number of blocks of data (e.g., message "ABCD" in FIG. 3a) from which it will traverse various layers of the network stack, or OSI.

Figure 3A:
FIG. 3a through FIG. 3f illustrate one embodiment for processing data in a DSL communication system.
Figure 3B:
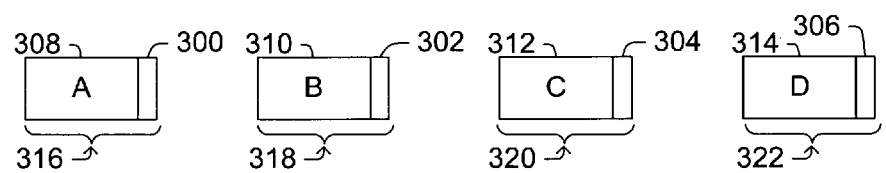

A Forward Error Correction (FEC) encoder 210 generates a certain number of redundancy bytes for each block of data. As shown in FIG. 3b, the FEC encoder adds redundancy bytes (300, 302, 304, 306) to each block of data (308, 310, 312, 314, respectively) to form an FEC codeword (316, 318, 320, 322, respectively). Typical DSL modems will support Reed-Solomon forward error correction, and may support others in addition to or in substitution thereof.

Figure 3C:
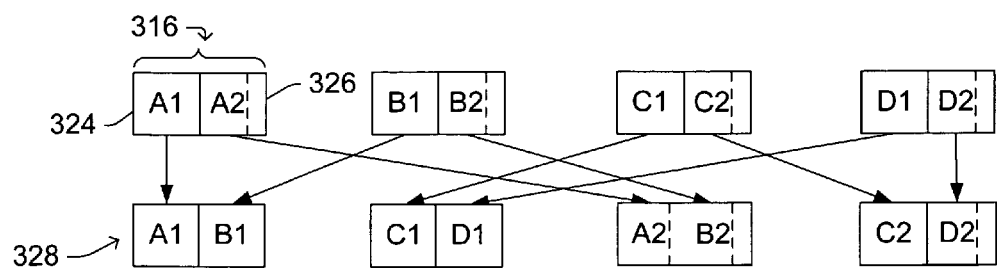

After the addition of redundancy bytes, an interleaver 212 mixes the FEC codewords in a manner so as to limit the effects of impulse noise corruption. In order to allow the interleaver 212 to mix the FEC codewords, the interleaver includes buffer memory, which introduces latency into the system. The buffer memory usually determines "interleaver depth". As FIG. 3c shows, the interleaver 212 divides each codeword (e.g., 316) into smaller segments, usually into separate bytes (e.g., 324 and 326), and then mixes (interleaves) the segments from different codewords in accordance with a predetermined algorithm to form an interleaved data stream 328. The algorithm for segment mixing may be such that segments belonging to the same FEC codeword (e.g., 324, 326) are placed remotely from each other in the interleaved data stream 328. During transmission, adjacent segments of one FEC codeword (e.g., 324, 326) can be separated by a time period that is associated with the interleaver depth, while all segments of one FEC codeword are spread over a time period associated with interleaver latency (also referred to as interleaver delay). Because impulse noise during any given short period of time results in corruption of only one or a few segments belonging to a particular codeword, as the interleaver delay is increased, the DSL system can withstand longer erasures, causing fewer errors in each reassembled (e.g., de-interleaved) codeword at the receive side. Although FIG. 3c shows one embodiment of an algorithm with which segments could be mixed, in other embodiments other algorithms could be used. Typical DSL modems will support convolutional interleaving, although they may support others in addition to or in substitution thereof. In some embodiments the interleaving depth can be adjusted during communication.

After the interleaver 212 processes the data, the modulator 214 modulates the data stream 328 onto DMT sub-carriers assigned for the transmission as a series of symbols, for example, via a one-to-one mapping, wherein each symbol is an N-dimensional (possibly complex) vector. In one embodiment, the modulator 214 first performs the initial encoding using bit distribution parameters agreed upon during a handshake or initialization stage of communication service. After encoding of the data stream, the modulator 214 then modulates the outgoing sub-carrier constellations (in the presented example using inverse discrete Fourier transform (IDFT)) onto a number of sub-carriers according to the set bit distribution, and provides the modulated (analog) signals to the line 206 according to sub-carrier power settings. The process of bit distribution, by which data is loaded onto the sub-carriers, may also be referred to as bit loading.

After the modulated signals traverse the line 206, the modulated signals are received at the second modem 204. Specifically, the demodulator 216 demodulates the received signals into individual sub-carrier constellations (e.g., by discrete Fourier transform or "DFT" techniques in the presented example), and decodes the received constellations according to the parameters agreed upon during communication service. In one embodiment, the demodulator 216 performs a DFT by computing a linear combination of all samples of the received symbol. Therefore, if an impulse noise burst erases (severely corrupts) even only a part of the samples of the received DMT symbol, all computed samples of the DFT for this symbol will be corrupted too, wherein the extent of corruption depends on the duration of the erased part. In one embodiment, if a rather significant fraction of the symbol (e.g., 10-15% of symbol time) is erased, a significant number of demodulated sub-carriers will be detected in error. In one embodiment the second modem 204 monitors the number of consecutive corrupted DMT symbols or the number of corrupted DMT symbols during a certain period of time, and not necessarily the specific duration of a noise burst or error burst.

Figure 3D:
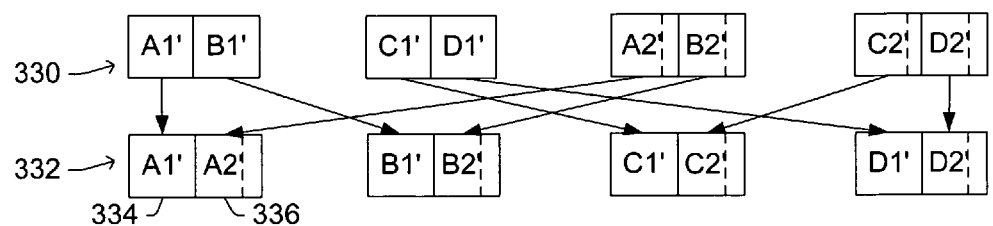

After the demodulator 216 receives the transmitted data, the deinterleaver 218 un-mixes (de-interleaves) the received data stream. As shown in FIG. 3d, the 330, the received data stream 330 is deinterleaved to retrieve the received segments stream 332, which includes one or more segments (e.g., 334, 336). The deinterleaver includes buffer memory, wherein the buffer memory may introduce latency into the system. In some implementations, the depth of this buffer memory may be dynamically adjusted during communication and synchronously adjusted with the depth of the interleaver buffer memory. Depending on whether noise alters the data transmitted on the line, the data of the received segments (e.g., A1', A2', B1', B2', ...) may or may not be equal to the data of the transmitted segments (e.g., A1, A2, B1, B2, ... respectively). Although FIG. 3d shows one embodiment of an algorithm with which the received data stream could be de-interleaved to retrieve the received segments 332, other embodiments could include other algorithms and all such variations are contemplated as falling within the scope of the invention.

Figure 3E:
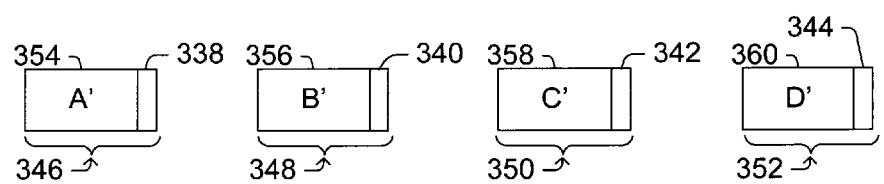

After the deinterleaver 218 reassembles the data as shown in FIG. 3e, the FEC decoder 220 uses the redundancy bytes (338, 340, 342, 344) of each received FEC codeword (346, 348, 350, 352, respectively) for recovering or correcting a certain number of corrupted data bytes from each corresponding block of data (354, 356, 358, 360, respectively). Thus, the FEC decoder 220 ensures that when a small number of bytes in a received codeword are corrupted, the original data transmitted in the codeword (e.g., A, B, C, D) can be recovered from the data in the received codeword (e.g., A', B', C', D'). Thus, increasing FEC redundancy (e.g., the number of redundancy bits) adds further FEC protection against impulse noise while effectively decreasing the data rate, and vice versa, wherein the goals of impulse noise protection and effective data rate involve a tradeoff.

Figure 3F:
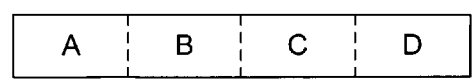

After the FEC codewords are processed by the FEC decoder 220, the resulting data can be reassembled at the application interface 222 (e.g., message "ABCD") as shown in FIG. 3f. This resulting data can, for example, be utilized for a user's benefit.

Therefore, FEC redundancy allows correction of a certain amount of corrupted data in each codeword and interleaving helps to reduce the amount of corrupted bytes in the individual codewords, whereby DSL systems may effectively combat a given amount of impulse noise in the line. Also, as discussed above, increasing FEC capabilities requires more redundancy bytes to be introduced, and reduces the data rate. Thus, there is a tradeoff between impulse noise protection and data rate in DSL systems.

In addition to the illustrated components, each modem 202 and 204 also includes a local management system (not shown), which controls and monitors various parameters of the transmitter and receiver. The local management system provides settings for control parameters including settings to the FEC encoder and decoder, as well as the interleaver and deinterleaver. For example, the local management system of the modem 202 can provide FEC parameters to the FEC encoder, wherein the FEC parameters relate to the number of redundancy bytes to be used. Further, each local management system can provide interleaver (IL) parameters to the interleaver or deinterleaver, wherein the IL parameters relate to the amount or level of interleaving thereof. Further, the local management systems can also provide the bit distribution settings or parameters, including sub-carrier bit allocations, gain settings, etc. for decoding and demodulation of the incoming data received from the line 206. The local management systems of the first and second modems 202 and 204, respectively, exchange FEC, IL, modulation, and other control parameters to provide matched settings of these parameters in both modems (thus, FEC parameters of FEC encoder will match the FEC parameters of the FEC decoder, and so on). Control information and messages between two modems are exchanges via an embedded management channel, such as one of the sub-carriers of the line 206 using any suitable communication or data exchange protocol, or a management channel embedded at the application interface, so as to coordinate parameters settings, rate adjustments, timing of changes, etc. The exchange of parameters ensures that the management systems at both modems set the same parameters for the complimentary functional components of the transmitter 202 and the receiver 204 (e.g., the modulator-demodulator, interleaver-deinterleaver).

In this regard, the various components of the communication system and other systems of the invention include suitable circuitry, state machines, firmware, software, logic, etc. to perform the various methods and functions illustrated and described herein, including but not limited to the methods described below. While the methods illustrated below are illustrated and described as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the operation of communication systems which are illustrated and described herein (e.g., communication system 200 in FIG. 2) as well as in association with other systems not illustrated, wherein all such implementations are contemplated as falling within the scope of the present invention and the appended claims.

Figure 4:
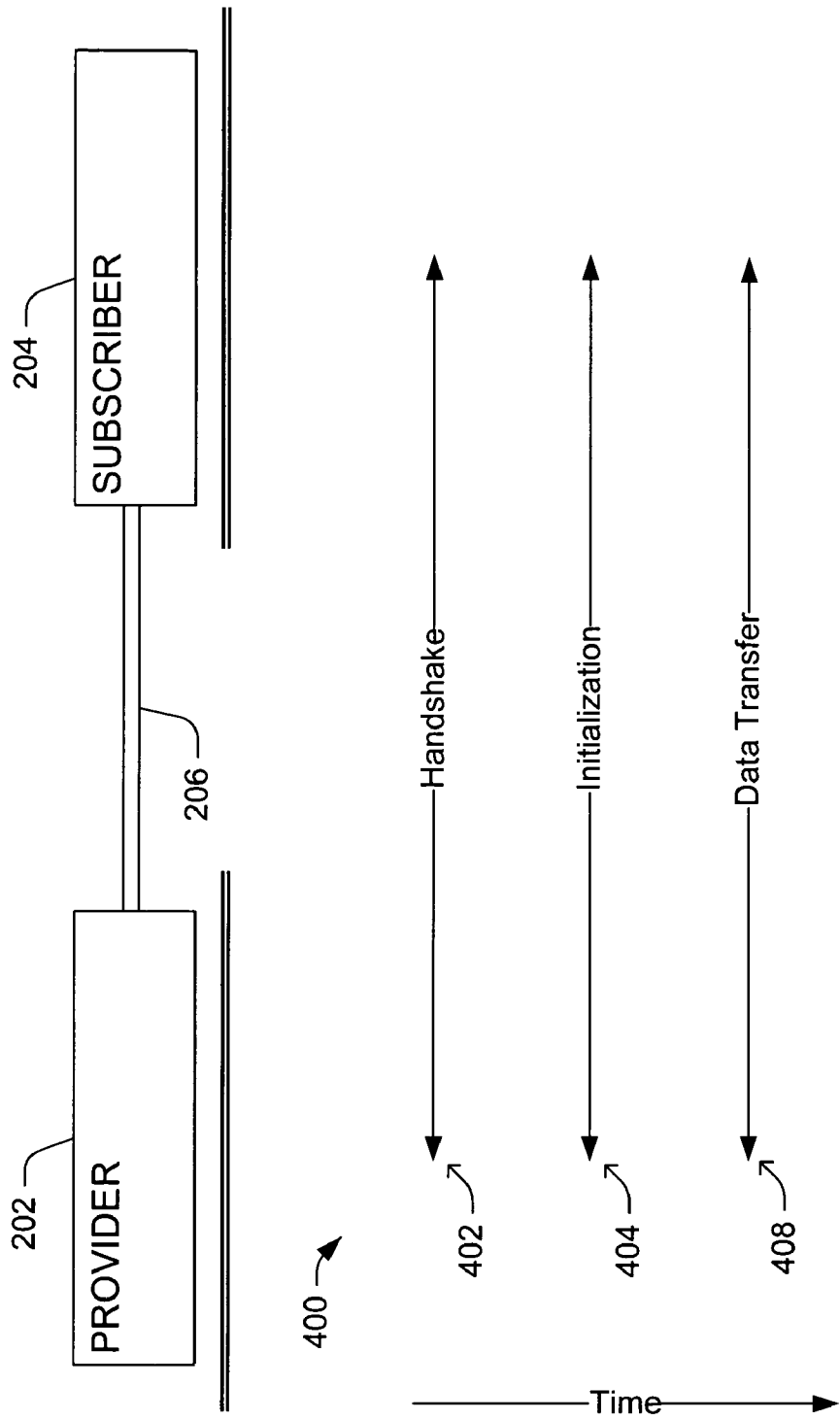
FIG. 4 is a block diagram one embodiment of a communication protocol for a DSL system.

FIG. 4 shows one communication protocol 400 for providing communication service, wherein horizontal lines indicate stages of communication or messages that are exchanged between the modems. In this protocol, the impulse noise protection of modems 202 and 204 can be set to a proper level. The illustrated communication protocol 400 includes several steps, which are further described below, namely: handshake 402, initialization 404 and data transfer 408.

In step 402, the modems can undergo a handshake session, which is somewhat analogous to two people shaking hands and introducing themselves when they first meet. The handshake session serves to identify the type of modems in communication, and to negotiate and agree on a common set of parameters for the communication session, wherein handshake messages are sent from one modem to the other to facilitate the negotiation and agreement of the common set of parameters. In one embodiment, the handshake session may be carried out in accordance with ITU-standard G.994.1.

After the handshake session, the modems can continue on to an initialization session in step 404. In general, the initialization session includes a message exchange and the capture of channel parameters (e.g., channel estimation, signal-to-noise ratio estimation, calculation of coefficients of the equalizer and echo canceller, and determination of bit loading on sub-carriers). In a typical situation, the signal-to-noise ratio (SNR) for each sub-carrier is measured during system initialization, and the maximum bit capacity of each sub-carrier is determined. Once the transmission capability of the system is thus assessed, the modems can assign more bits (e.g., larger constellation sizes) onto sub-carriers with higher SNR compared to sub-carriers having lower SNR and the sub-carrier relative transmit powers (gains) are set. Illustrative initialization sessions are described in ITU-T recommendation G.992.1 (ADSL) or ITU recommendation G.993.2 (VDSL2).

After the initialization session 404, modems can transfer data in step 408, (which may also be referred to as showtime) wherein during data transfer the modems utilize impulse noise protection parameters (e.g., FEC parameters and IL parameters, as previously discussed). The initial impulse noise protection parameters could be a default (if no information about the impulse noise in the line is available) or could be set to values that take into account previous experience on this line. If a change in data transfer is required, one of several methods could be utilized, including but not limited to: Seamless Rate Adaptation and Dynamic Rate Repartitioning.

Figure 5:
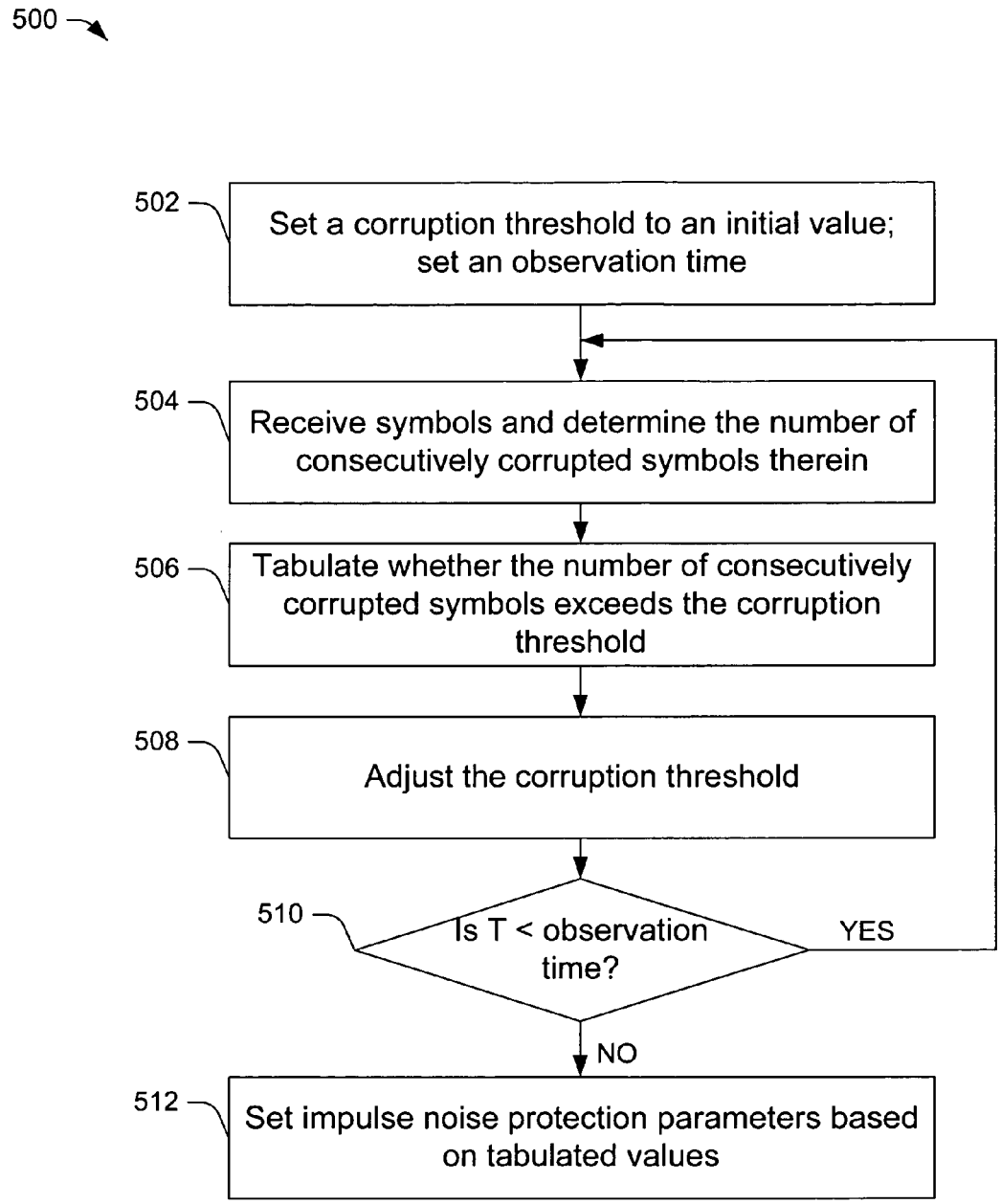
FIG. 5 is a flowchart illustrating one embodiment of a method for setting impulse noise protection parameters.

Referring now to FIG. 5, method 500 can determine the impulse noise protection parameters that the modems will use during communication. In one embodiment, all or portions of the method 500 will occur during or after the initialization session 404, (e.g., during showtime). In other embodiments, all or portions of the method 500 can occur in other portions of the communication protocol 400.

In one embodiment, the initiating modem (e.g., CO modem that is a master of the network) selects one or more corruption thresholds and communicates them to a responding modem (e.g., CP modem) via the management channel. The initiating modem can also select an observation time T and communicate it to the responding modem. Using the corruption thresholds and the observation time, the responding modem can monitor and count the number of consecutively corrupted symbols and determine whether the number of consecutively corrupted symbols is greater than or equal to the corruption threshold. For each corruption threshold during the observation time, this determination (i.e., whether the number of consecutively corrupted symbols is greater than or equal to the given corruption threshold) is tabulated and separately communicated back to the initiating modem. Based on the received determinations and the value of observation time, the initiating modem can determine whether a change needs to be made to the impulse noise protection parameters. This decision could be also made by the network operator (manually) or by a request from the management system (automatically). Thus, the impulse noise protection parameters can be set or adjusted such that the modems can exchange error-free messages with a relatively high effective data rate.

In one embodiment, the term "consecutive corrupted symbols" or "consecutive corrupted DMT symbols" includes symbols that are received temporally adjacent to one another at the receiver (e.g., symbols received consecutively in time) as well as symbols that are transmitted adjacent to one another from the transmitter (e.g., symbols transmitted sequentially from the transmitter). Further, in one embodiment, the term "corrupted symbols" includes symbols where most of the DMT sub-carriers are received with errors. In another embodiment, the term "corrupted symbols" includes symbols which have more errors than could be corrected by the FEC with assistance of the interleaver. In both embodiments this can result when an impulse noise burst hits the whole DMT symbol or its significant part.

In step 502, the modems 202 and 204 set an initial corruption threshold and an observation time. In one embodiment, an initiating modem may select initial corruption thresholds and an initial observation time, both of which may be set to a default value, and communicates these parameters to the responding modem via the management channel. The corruption thresholds in this embodiment can typically be expressed in the number of consecutive corrupted DMT symbols that the modem can handle with no errors (e.g., the number of consecutive corrupted DMT symbols for which the modem can correct all errors, thereby ensuring retrieval of the originally transmitted messages).

In step 504, the responding modem receives symbols that were transmitted by the initiating modem and determines the number of consecutively corrupted DMT symbols therein. In other embodiments, each modem 202 and 204 receives symbols that were transmitted by the other modem and monitors the number of consecutively corrupted DMT symbols therein.

In step 506, the responding modem communicates via the management channel to the initiating modem whether the number of consecutively corrupted symbols is greater than or equal to the corruption threshold.

In step 508, each modem stores a tabulated value that is related to whether the number of consecutively corrupted symbols is greater than or equal to the corruption threshold. For example, if the corruption threshold is set to "seven DMT symbols", and if the responding modem has detected six consecutive corrupted DMT symbols, then the corruption of the symbols would not exceed the corruption threshold. Conversely, if the corruption threshold is set to "three DMT symbols", and if the modems detected ten consecutive corrupted symbols, then the corruption of the symbols would exceed the corruption threshold. In either case, the modem stores the result, for example in a memory array.

In step 510, the modem selectively adjusts the corruption threshold. For example, the modem could increment or decrement the corruption threshold, or assign additional corruption thresholds to get simultaneous multiple measurements.

In step 512, the modem determines if the present time, T, is less than the end of the observation time. The observation time can be started either automatically from a default instant during Showtime (e.g., the start of Showtime) or when the initiating modem sends a special command to indicate the start of the observation time. The present time T is typically a running time value that is reset at the start of the observation time. In some embodiments, the observation time could be adjusted. For example, if there are too many errors during the selected observation time, a shorter time could be assigned. If there are too few errors during the selected observation time, the observation time could be extended. The observation time and the present time may relate to one of several values, including but not limited to: an actual time values (e.g., 10:00:01 am, EST), a watchdog timer value or some other timer value, a count of DMT symbols, or a count value related to the amount of data transmitted (e.g., a sequence number in the header of a packet).

If the present time, T is less than the observation time (YES at 512), then the method 500 repeats steps 504 through 512 until T is greater than or equal to the observation time. For example, in one embodiment, each modem repeatedly: determines the number of consecutively corrupted symbols, tabulates whether the number of consecutively corrupted symbols is within the corruption threshold, and then increments the corruption threshold. By repeatedly performing these steps, the modem can gather information as to the most advantageous value for the corruption threshold. In typical embodiments, more than one corruption threshold is used to decide whether the initial impulse protection parameters are appropriate. The reports for each threshold can be independent.

If the present time, T, is greater than or equal to the observation time (NO at 510), or after several sequential periods of the observation time, the method 500 goes to step 512 wherein the management system of the initiating modem may decide (e.g., automatically) to modify the impulse noise protection parameters based on the obtained tabulated values. The setting of the impulse noise protection parameters can be done synchronously at both sides of the network by a special command. The setting of the impulse noise protection parameters could also be made by the network operator (e.g., manually). In this case the operator triggers the management system to initiate the necessary commands to change impulse noise protection parameters simultaneously at both sides of the line. If it is uncertain whether the observation time is sufficient to capture a particular number of symbols, the modems could extend the monitoring period to get a more confident result. Because the impulse noise on the line may affect each modem differently, the impulse noise protection parameters in one direction of transmission (e.g., data transmitted from modem 202 to modem 204) may differ from the impulse noise protection parameters in the other direction (e.g., data transmitted from modem 204 to modem 202).

As previously discussed, in one embodiment after the impulse noise protection parameters are set in 514, the modems begin data transfer with the impulse noise protection parameters. The impulse noise protection parameters can include, but are not limited to: FEC parameters (e.g., related to the number of redundancy bits to be used), IL parameters (e.g., related to the depth of the interleaver or the amount of interleaving), bit distribution parameters, gain settings, or combinations thereof. The previously discussed method is one way to set the impulse noise protection parameters properly, such that the modem may transmit data with a relatively high effective bit rate as well as a relatively low error rate.

Because there is a tradeoff between impulse noise protection and effective data bandwidth, by decreasing the impulse noise protection in appropriate circumstances, bandwidth can be increased.

Figure 6:
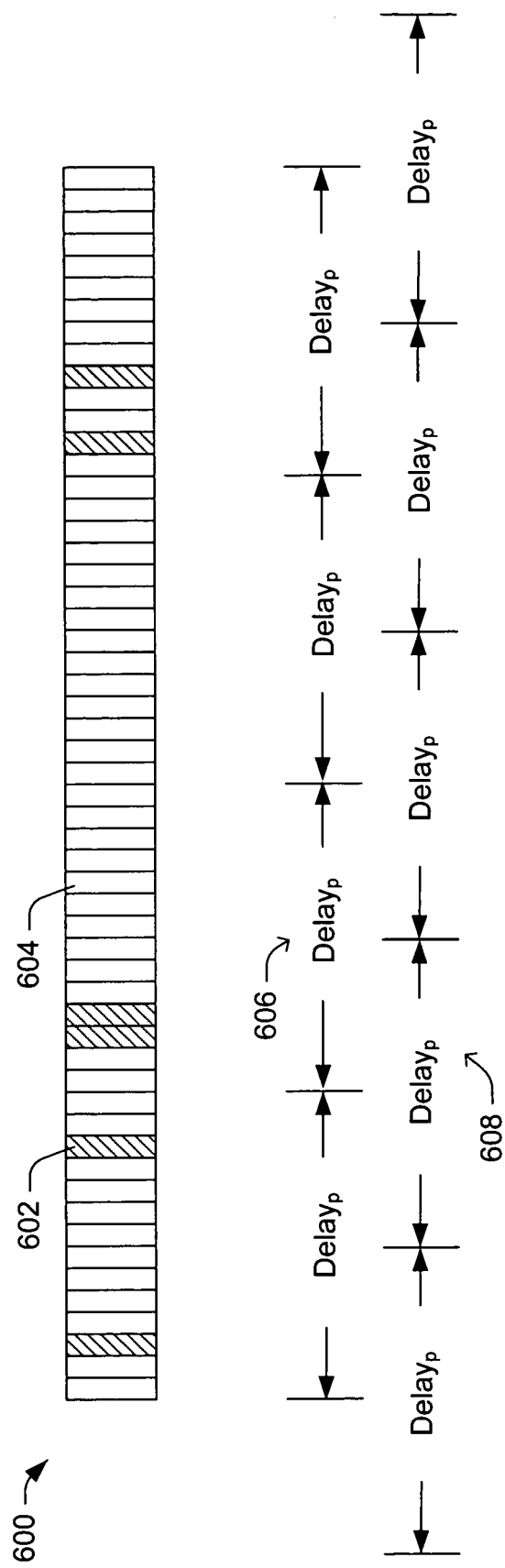
FIG. 6 is a chart illustrating one embodiment of a method for setting impulse noise protection parameters.

In another embodiment discussed with reference to FIG. 6, modems can determine impulse noise protection parameters by evaluating the number of severely corrupted DMT symbols in a sliding time window that is related to the time span when a FEC codeword is transmitted, for example, to the interleaver delay in the latency path. This embodiment is advantageous in practical cases when impulse noise has a nature of multiple short events, randomly distributed in time, rather than isolated impulse noise events that corrupt a group of consecutive DMT symbols. One such embodiment is now discussed below.

In one embodiment, interleaving spreads the bits (or bytes) of the transmitted FEC codeword over a certain time span, thus delay is introduced as latency into DSL communication system. In one embodiment consistent with the ITU-G.993.2 standard, the delay for the latency path introduced by the interleaver can be estimated by expression (1) below:

$$\text{delay} = \frac{S \times (D-1)}{q \times f_s} \times \left(1 - \frac{q}{N_{FEC}}\right), \quad (1)$$

where S is the number of DMT symbols over which the codeword spans, D is the interleaving depth, q is the number of interleaver blocks in an FEC codeword, $f_s$ is the symbol rate in kilo-symbols/s, and $N_{FEC}$ is the FEC codeword size.

In this embodiment, by using redundancy bits, the FEC encoder and decoder can facilitate the correction of a given number of errored bits (or bytes). The interleaver spreads the bits of the FEC codeword over a time period that is associated with the interleaver delay (in G.993.2 computed using (1)) so that impulse noise with a certain duration can corrupt only limited number of bits belonging to a single codeword. In the case of the multiple impulse noise events during the time span of the codeword, several DMT symbols can be corrupted and thus several groups of bits belonging to the same FEC codeword may be erased. In one embodiment consistent with the ITU-G.993.2 standard, the FEC decoder will be able to correct all errors in the transmission path if the number of corrupted DMT symbols during the delay time period does not exceed the impulse noise protection value in equation (2) below:

$$INP = \frac{8 \times D \times \left\lfloor \frac{R}{2 \times q} \right\rfloor}{L} = \frac{S \times D \times \left\lfloor \frac{R}{2 \times q} \right\rfloor}{N_{FEC}}, \quad (2)$$

where R is number of redundancy octets in the codeword, L is the number of bits transmitted in each DMT symbol, and the other variables are the same as in expression (1) above.

Based on equations (1) and (2), a modem (e.g., the responding modem) can estimate the level of its own protection with respect to the impulse noise by computing the number of severely degraded DMT symbols in a time frame equal to the span of the FEC codeword. A good estimate of this time gives the interleaver delay. By shifting the time frame by a time interval (in the described case this interval can equal to a DMT symbol period), the modem can determine the total number of potentially corrupted bits during the FEC codeword time span and a pattern with which the impulse noise burst are occurring, and then set the impulse noise protection parameters accordingly. For example, FIG. 6 illustrates a stream of symbols 600 that includes corrupted symbols (e.g., 602) and non-corrupted symbols (e.g., 604). The number of corrupted symbols during the time of the codeword span or of the interleaver delay depends on the relative position of any impulse noise bursts within the time frame. For example, in a first time frame 606, two bursts resulting in two corrupted symbols occur. If the time frame is shifted, then in a second time frame 608, three bursts resulting in three corrupted symbols occur. Note that the three corrupted symbols in this example are not necessarily all consecutive. Thus, if the modems have to find a maximum value of the number of impulse noise bursts during the FEC codeword time span, the modems could selectively adjust the position of the time window and record the total number of corrupted symbols that are detected during each time window. By comparing the total number of detected corrupted symbols during the time window to the corruption threshold, the detecting modem can then calculate appropriate impulse noise protection parameters. The management channel of the detecting modem can then communicate the total number of symbols and/or the appropriate impulse noise protection parameters to the other modem. Further, a fraction of delay, (e.g., delay/m where m is any positive integer) could also be used as an approximation of the sliding time window.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of determining communication parameters in a communication system, comprising:
   (a) determining a number of corrupted data elements in a set of received data elements;
   (b) storing a tabulated value that is representative of whether the number of corrupted data elements has a predetermined relationship with a corruption threshold; and
   (c) selectively adjusting the corruption threshold as a function of the tabulated value.

2. The method of claim 1, further comprising:
   repeating steps (a) through (c) so long as a present time is less than a predetermined observation time.

3. The method of claim 2, further comprising:
   (d) for each corruption threshold, communicating over a communication line whether the number of corrupted data elements is greater than or equal to that corruption threshold.

4. The method of claim 3, further comprising:
   determining one or more impulse noise protection parameters based on one or more of the tabulated values.

5. The method of claim 4, further comprising:
   setting the corruption threshold to an initial value prior to steps (a) through (b); and
   setting the predetermined observation time prior to steps (a) through (b).

6. The method of claim 5, wherein steps (a) through (C) are carried out during data transfer of a DSL communication protocol.

7. The method of claim 1, wherein determining the number of corrupted data elements comprises determining a number of consecutive corrupted data elements.

8. The method of claim 1, wherein determining a number of corrupted data elements in a set of received data elements comprises determining a number of corrupted data elements in one or more predetermined time intervals within an observation time period.

9. The method of claim 8, wherein the predetermined time intervals correspond to a time frame associated with a span of an FEC codeword that has been interleaved.

10. The method of claim 8, further comprising delaying the predetermined time interval.

11. The method of claim 10, wherein the delay is positive or negative.

12. A method of determining one or more communication parameters in a communication system, comprising:
    determining if a first set of received symbols is corrupted so as to have a first predetermined relationship with an initial corruption threshold;
    determining if a second set of received symbols is corrupted so as to have another predetermined relationship with an adjusted corruption threshold;
    setting the one or more communication parameters as a function of whether the initial corruption threshold or the adjusted corruption threshold has the predetermined relationship associated therewith.

13. The method of claim 12, further comprising:
    transmitting a message specifying whether the first or second set of received symbols is corrupted so as to exceed an adjusted corruption threshold.

14. The method of claim 13, wherein the impulse noise protection parameters relate to one or more of: an interleaver block size, an interleaver depth, an FEC codeword size, a number of redundancy bits, a bit distribution setting, a gain scale setting.

15. The method of claim 12, further comprising
    transmitting a message to a remote modem specifying the adjusted corruption threshold.

16. The method of claim 12, wherein the determining comprises determining whether a consecutive number of corrupted symbols in the first set has the first predetermined relationship with the initial corruption threshold, and determining whether a consecutive number of corrupted symbols in the second set has the another predetermined relationship with the adjusted corruption threshold.

17. The method of claim 12, wherein the communication parameters relate to impulse noise protection parameters.

18. A modem, comprising:
    a transceiver coupleable to a communication line;
    a deinterleaver coupled to the transceiver, wherein the deinterleaver is configured to buffer and un-mix a plurality of data elements; and
    a forward error correction decoder coupled to the deinterleaver, wherein the forward error correction decoder is configured to correct corrupted data bytes included in the plurality of data elements; and
    wherein the modem is configured to receive data elements from the communication line and determine whether a number of consecutive data elements of the received data elements are corrupted so as to have a predetermined relationship with a corruption threshold.

19. The modem of claim 18, wherein the modem is configured to set an impulse noise protection parameter based on whether the number of consecutive corrupted data elements reach or exceed the corruption threshold.

20. The modem of claim 19, wherein the modem is further configured to adjust the corruption threshold, receive data elements and determine the number of consecutively corrupted data elements therein, and tabulate whether the number of consecutively corrupted data elements reaches or exceeds the adjusted corruption threshold.

21. The modem of claim 18, wherein the modem is configured to determine a number of consecutive corrupted data elements in one or more predetermined time intervals within an observation time period and compare the number to the corruption threshold or a threshold associated therewith.

22. The modem of claim 21, wherein the predetermined time interval corresponds to a time frame associated with a span of an FEC codeword that has been interleaved.

23. The method of claim 21, wherein the modem is further configured to delay the predetermined time interval.

24. The method of claim 23, wherein the delay is positive or negative.

25. A communication system, comprising:
    a modem configured to selectively couple to a communication line;
    wherein the modem is configured to receive data elements from the communication line and determine whether a number of consecutive received data elements are corrupted so as to have a predetermined relationship with a corruption threshold; and wherein the modem is configured to set an impulse noise protection parameter based on whether the number of consecutive received data elements are corrupted so as to have the predetermined relationship with the corruption threshold.

26. The communication system of claim 25, wherein the modem is further configured to adjust the corruption threshold, receive data elements and determine the number of consecutively corrupted data elements therein, and tabulate whether the number of consecutively corrupted data elements reaches or exceeds the adjusted corruption threshold.

27. The communication system of claim 25, wherein the modem comprises:
   a transceiver coupled to the communication line;
   a deinterleaver coupled to the transceiver, wherein the deinterleaver is configured to buffer and un-mix the data elements; and
   a forward error correction decoder coupled to the deinterleaver, wherein the forward error correction decoder is configured to correct corrupted data bytes included in the data elements.

28. The communication system of claim 27, further comprising:
   another modem coupleable to the communication line;
   wherein the another modem is configured to transmit the data elements onto the communication line.

29. A system for determining one or more impulse noise protection parameters, comprising:
   means for receiving and analyzing symbols on a communication line by determining a number of consecutive corrupted received symbols, and comparing the number to the corruption threshold or a threshold associated therewith; and
   means for determining one or more impulse noise protection parameters based on one or more tabulated values that are related to whether the number of consecutive symbols determined to be corrupted reach or exceed the corruption threshold.

30. The system of claim 29, further comprising:
   means for transmitting symbols on a communication line.

31. The system of claim 29, wherein the means for receiving and analyzing symbols further comprises:
   means for selectively adjusting the corruption threshold in an iterative fashion.

32. The system of claim 31, wherein the means for receiving and analyzing symbols further comprises:
   means for storing the one or more tabulated values in an iterative fashion, wherein the iterative fashion in which the tabulated values are stored corresponds to the iterative fashion with which the corruption threshold is adjusted.

33. The system of claim 32, further comprising:
   means to communicate the tabulated values to a remote modem via the communication line.

34. The system of claim 29, wherein the means for receiving and analyzing symbols further comprises:
   means for transmitting a message on the communication line that specifies whether the received symbols are corrupted so as to exceed an adjusted corruption threshold.

* * * * *